Patented May 26, 1953

2,640,082

UNITED STATES PATENT OFFICE 2,640,082

PROCESS FOR SYNTHESIS OF DIAMINES

Ralph C. Schreyer, Wilmington, Del., assignor to E. I. du Pont de Nemours and Company, Wilmington, Del., a corporation of Delaware No Drawing. Application November 8, 1950, Serial No. 194,726

1 Claim. (Cl. 260—583)

This invention relates to a new process for synthesizing diamines from relatively simple starting materials, and it also relates to certain new diamines which can be produced by this process.

It is an object of this invention to provide a novel two-step process for synthesizing diamines. Another object of the invention is to provide diamines capable of being produced in a most economical manner from relatively simple starting materials. Other objects of the invention will appear hereinafter.

In accordance with this invention is has been discovered that diamines can be produced in a very practical manner by means of an entirely new route. The process involves the reaction of hexenenitriles of the formula:

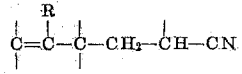

wherein the bonds shown may carry either hydrogen or alkyl groups containing not more than five carbon atoms, and R is an alkyl group containing not more than five carbon atoms, with carbon monoxide and hydrogen in the presence of a hydrocarbonylation catalyst to produce 6-cyano-hexanals, which are in turn subjected to reductive amination in the presence of hydrogen, ammonia and a hydrogenation catalyst to produce substituted heptamethylenediamines.

In accordance with a preferred embodiment of this invention, the starting material employed in the foregoing two-step process is the adduct formed by reaction between an olefin of the formula

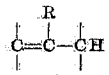

and an unsaturated nitrile of the formula

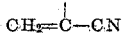

According to another preferred embodiment of the invention, 5-methyl-5-hexenenitrile is reacted with carbon monoxide and hydrogen in the presence of a cobalt hydrocarbonylation catalyst to produce 6-cyano-3-methylhexanal, which in turn is subjected to reductive amination in the presence of ammonia, hydrogen and a hydrogenation catalyst to produce the novel diamine compound, 3-methylheptamethylenediamine, having the formula,

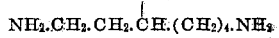

having a boiling point of 53°–60° C. (0.4–0.6 mm.), and a refractive index $N_D^{23}=1.4601$.

In carrying out the first step of the present invention, the hexenenitrile is reacted with at least 1 mol of carbon monoxide and 1 mol of hydrogen per mol of hexenenitrile. Preferably the carbon monoxide and hydrogen are employed in amounts considerably in excess of the stoichiometric requirements, the ratio of carbon monoxide to hydrogen being from about 2:1 to 1:3. The reaction may be carried out at temperatures of from 75° C. to 200° C., and preferably from 150° C. to 175°. Catalysts which are useful in carrying out this step include hydrogenation catalysts in general, as well as the carbonyls and soluble salts of various hydrogenating metals. Catalysts of this general nature are referred to as hydrocarbonylation catalysts. The preferred hydrocarbonylation catalysts comprise cobalt, which may be employed, for instance, in the metallic form, in the form of a soluble salt such as cobalt naphthenate, in the form of insoluble compounds such as cobalt oxides, or in the form of cobalt carbonyls. Pressures of at least 50 atmospheres, and preferably in excess of 325 atmospheres, are employed in this step.

The reductive amination step is carried out in the presence of at least one mol of ammonia and at least 3 mols of hydrogen per mol of the 6-cyano-hexanal. Preferably large excesses of both hydrogen and ammonia are employed. Since the catalysts employed in the hydrocarbonylation step are for the most part also useful in promoting the reductive amination step, it is often advantageous to employ as the starting material for this latter step the crude mixture resulting from the first step of the process. Alternately, the 6-cyano-hexanol produced in the first step may be purified to the desired extent, as by distillation or the like, prior to the reductive amination step.

Either the same catalyst or a different catalyst may be employed in the reductive amination step. Catalysts which are useful in this step include the hydrogenation catalysts generally, and in particular the cobalt-containing hydrogenation catalysts. The reductive amination step is carried out at temperatures of from 75° C. to 250° C., and preferably at temperatures of from 100° C. to 150° C. The pressure employed in this step should be greater than 50 atmospheres, and preferably in excess of 300 atmospheres.

The starting materials employed in the process of the invention are the 5-hexenenitriles of the formula

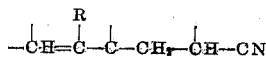

wherein the bonds shown are attached to a radical of the group consisting of hydrogen and alkyl groups containing not more than 5 carbon atoms and R is an alkyl group containing not more than 5 carbon atoms. The preferred hexenenitrile starting materials are 5-methyl-5-hexenenitrile, 5-neopentyl-5-hexenenitrile, and 2,5-dimethyl-5-hexenenitrile. As stated above, these hexenenitriles are most satisfactorily obtained as the adducts of an olefin such as isobutylene, diisobutylene, propylene or amylene with an unsaturated nitrile such as acrylonitrile or methacrylonitrile. When 5-methyl-5-hexenenitrile is employed as the starting material, the novel and important diamine, 3-methylheptamethylenediamine is obtained in a most practical and economical manner.

The process of this invention and the novel diamines resulting from this process are illustrated by the following examples:

EXAMPLE 1

*Preparation of 3-methylheptamethylenediamine*

A charge of 42.5 grams of 5-methyl-5-hexenenitrile, 150 cc. of diethyl ether, and 5 grams of a reduced cobalt oxide catalyst was processed with a 1:1 gas mixture of carbon monoxide and hydrogen at 150° C.–175° C. and 700 atmospheres pressure for 1.5 hours. The 6-cyano-3-methylhexanal thus obtained was subjected to reductive amination in the presence of about 119 grams of ammonia, 5 grams of reduced cobalt oxide catalyst and an excess of hydrogen at 160° C.–170° C. and 700 atmospheres pressure for 1 hour. Distillation of the resulting reaction mixture gave a good yield of the novel compound, 3-methyl-heptamethylenediamine, having a boiling point of 53° C.–60° C. (0.4–0.6 mm.), and a refractive index $N_D^{23}=1.4601$. Analysis—calculated for $C_8H_{20}N_2$: C, 66.5; H, 13.87; N, 19.45; neutral equivalent, 72. Found: C, 64.78; H, 13.65; N, 19.30; neutral equivalent, 73.

EXAMPLE 2

*Preparation of 2,5-dimethylheptamethylenediamine*

A mixture of 80 grams of 2,5-dimethyl-5-hexenenitrile, 150 cc. of diethyl ether and 5 grams of reduced cobalt oxide catalyst was processed with a 1:1 gas mixture of carbon monoxide and hydrogen at 160° C.–170° C. and 700 atmospheres pressure for 1 hour. The resulting 6-cyano-3,6-dimethylhexanal was treated with 119 grams of ammonia, 10 grams of reduced cobalt oxide catalyst and an excess of hydrogen at 165° C.–172° C. and 700 atmospheres pressure for 1 hour. Distillation of the product gave 15 grams of 2,5-dimethylheptamethylenediamine, having a boiling point of 75° C.–78° C. (2.5–3 mm.) and a refractive index $N_D^{25}=1.4591$. Analysis—calculated for $C_9H_{22}N_2$: N, 17.72; neutral equivalent, 79. Found: N, 17.59; neutral equivalent, 79.

EXAMPLE 3

*Preparation of 3-neopentylheptamethylenediamine*

A mixture of 50 grams of 5-neopentyl-5-hexenenitrile, 100 cc. of diethyl ether and 10 grams of reduced cobalt oxide catalyst was processed with a 1:1 gas mixture of carbon monoxide and hydrogen at 172° C.–175° C. and 700 atmospheres pressure for 1 hour. The resulting 6-cyano-3-neopentylhexanal was processed with about 102 grams of ammonia, 5 grams of reduced cobalt oxide catalyst and an excess of hydrogen at 160° C.–185° C. and 700 atmospheres pressure for one hour. Upon distillation of the product there was obtained a good yield of the compound 3-neopentylheptamethylenediamine having a boiling point of 96° C.–98° C. (1 mm.), and a refractive index $N_D^{28}=1.4609$. Analysis—calculated for $C_{12}H_{28}N_2$: N, 14.00; neutral equivalent, 100. Found: N, 13.83; neutral equivalent, 100.7.

The hexenenitriles employed in the foregoing examples were obtained by the reaction of the suitable olefins and unsaturated nitriles at temperatures of from 100° C.–300° C. and in mol ratios of from about 1 to 4 mols olefin per mol of unsaturated nitrile. The 5-methyl-5-hexenenitrile employed in Example 1 was obtained as the adduct of isobutylene and acrylonitrile. The starting material for Example 2 was obtained by reacting together methacrylonitrile and isobutylene. The 5-neopentyl-5-hexenenitrile employed in Example 3 was obtained by processing 160 grams of diisobutylene, 53 grams of acrylonitrile and 1 gram of hydroquinone at a temperature of 225° C. for 4 hours. In operating an overall process for preparing diamines from unsaturated nitriles, the olefin-nitrile adduct, may, if desired, be subjected to a purification treatment prior to the hydrocarbonylation step.

The process of this invention makes possible the preparation of highly useful diamines in a simple manner from hexenenitriles, which, in turn, are readily obtainable from the reaction of low-molecular weight olefins and low-molecular weight unsaturated nitriles.

The novel diamines produced by this process, and in particular, 3-methylheptamethylenediamine, have proved very valuable as intermediates for the preparation of polyamides having unusual properties not obtainable in polyamides prepared from other diamines. Properties of certain of these polyamides are set forth in the following table. In this table, Yarn #1 was derived from a polyamide produced from 3-methylheptamethylenediamine and terephthalic acid, the original yarn having been elongated 3.5 times by drawing at 105° C. in order to produce the yarn employed in the tests. Yarn #2 was derived from a polyamide produced from 3-neopentylheptamethylenediamine and terephthalic acid, the original yarn having been elongated 4.8 times by drawing at 105° C. in order to produce the yarn employed in the tests.

TABLE

| | Zero Strength Temperature, °C. | Inherent Viscosity | Tensile Strength, grams/denier | Percent Elongation At Break | Initial Tensile Modulus, grams/denier | Compliance Ratio * | Work Recovery, Percent | | |
|---|---|---|---|---|---|---|---|---|---|
| | | | | | | | 1% | 3% | 5% |
| Yarn #1 | 220 | 0.65–0.70 | 1.2 | 13 | 35 | 0.79 | 92 | 83 | 50 |
| Yarn #2 | 170 | 0.65–0.70 | 2.4 | 23 | 46 | 0.37 | 93 | 84 | 60 |

* The compliance ratio is an arbitrary unit which is equal to $\frac{2}{\text{load at 10\% elongation}} - \frac{1}{\text{load at 5\% elongation}}$.

The compliance ratio of wool is 1.0, while the compliance ratio of nylon is 0.

The high recovery properties and the high compliance ratio indicate that the polyamide derived from 3-methylheptamethylenediamine and terephthalic acid gives a yarn which may be highly useful in the manufacture of wool-like fabrics.

Since many modifications of the feature described herein can be made by those skilled in the art without departing from the spirit and scope of the present invention, it is not intended that the invention should be restricted other than by the claim:

I claim:

A process which comprises reacting 5-methyl-5-hexenenitrile with at least one mol of carbon monoxide and at least one mol of hydrogen per mol of the hexenenitrile at a temperature of 75° C. to 200° C. and at a pressure of at least 50 atmospheres in the presence of a catalyst taken from the group consisting of cobalt, cobalt naphthenate, cobalt oxides, and cobalt carbonyls to produce 6-cyano-3-methylhexanal, and thereafter reacting the 6-cyano-3-methylhexanal thus produced with at least three mols of hydrogen and at least one mol of ammonia per mol of the hexanal at a temperature of 75° C. to 250° C. and at a pressure of at least 50 atmospheres and separating 3-methylheptamethylenediamine from the resulting reaction mixture.

RALPH C. SCHREYER.

References Cited in the file of this patent

UNITED STATES PATENTS

| Number | Name | Date |
|---|---|---|
| 2,279,745 | Stevenson | Apr. 14, 1942 |
| 2,309,509 | Howk et al. | Jan. 26, 1943 |
| 2,437,600 | Gresham et al. | Mar. 9, 1948 |
| 2,437,906 | Bruson et al. | Mar. 16, 1948 |
| 2,564,131 | Schreyer | Aug. 14, 1951 |

FOREIGN PATENTS

| Number | Country | Date |
|---|---|---|
| 619,576 | Great Britain | Mar. 11, 1949 |
| 570,532 | Great Britain | of 1944 |
| 583,565 | Germany | Sept. 21, 1933 |